(12) United States Patent
Kai et al.

(10) Patent No.: US 7,549,565 B2
(45) Date of Patent: Jun. 23, 2009

(54) CONVEYOR FOR SHEET-SHAPED THIN PLATE AND METHOD OF CONVEYING SAME

(75) Inventors: Hideyuki Kai, Hamamatsu (JP); Manabu Kobayashi, Hamamatsu (JP); Masahiro Ogawa, Hamamatsu (JP); Ryoichi Kimura, Hamamatsu (JP); Sachio Kishino, Hamamatsu (JP); Kenji Tsukamoto, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 631 days.

(21) Appl. No.: 11/219,758

(22) Filed: Sep. 7, 2005

(65) Prior Publication Data

US 2006/0151291 A1 Jul. 13, 2006

(30) Foreign Application Priority Data

Jan. 11, 2005 (JP) ............................ P2005-004173
May 31, 2005 (JP) ............................ P2005-160188

(51) Int. Cl.
*B23K 37/00* (2006.01)
*B65G 13/06* (2006.01)

(52) U.S. Cl. ............................ 228/5.7; 228/17; 198/789

(58) Field of Classification Search .................. 72/250, 72/251, 166–175; 492/1–3; 156/199–201, 156/205–206, 209, 459, 461–463, 544, 546, 156/549–551; 198/780–789; 228/5.7, 17; 83/401–437.7

See application file for complete search history.

(56) References Cited

U.S. PATENT DOCUMENTS 4,151,031 A * 4/1979 Goad et al. .................. 156/201
5,328,083 A * 7/1994 Peru et al. .................... 228/5.7
5,634,255 A 6/1997 Bishop

FOREIGN PATENT DOCUMENTS

EP 0 315 354 A2 5/1989
FR 2834701 A1 * 7/2003
JP 2-212037 8/1990

* cited by examiner

*Primary Examiner*—Kevin P Kerns
*Assistant Examiner*—Megha Mehta
(74) *Attorney, Agent, or Firm*—Oblon, Spivak, McClelland, Maier & Neustadt, P.C.

(57) ABSTRACT

A conveyor for guiding and conveying a plurality of sheet-shaped thin plates in rows arranged side by side to a welding position at which ends of the adjacent thin plates are butted and welded to each other, includes a plurality of conveying paths, which are adjacent to each other, having different conveying surfaces which are placed on a same horizontal plane, and a guide unit disposed between the adjacent two conveying paths for guiding the thin plates on one of the conveying paths with respect to another one thereof toward the welding position. Each of the conveying paths is composed of a plurality conveying rollers, and the guide unit includes guide rollers each having a guide surface for guiding the thin plate on the one of the conveying paths in a state that the thin plate on the one conveying path is partially depressed with respect to the another one of the conveying path.

12 Claims, 6 Drawing Sheets

CONVEYOR FOR SHEET-SHAPED THIN PLATE AND METHOD OF CONVEYING SAME

BACKGROUND OF THE INVENTION

1. Technical Field

The present invention relates to a conveyor for sheet-shaped thin plates, which are especially butted against and welded each other, and a method of conveying the same.

2. Related Art

For example, in a case where steel plates having different materials and thicknesses are used for forming adjacent portions or parts of, for example, a vehicle body, it is necessary to weld two or more sheet-shaped thin plates (steel plates), which are previously cut into fine rectangle shape, continuously in a longitudinal direction by using a continuous welding apparatus, thus forming tailored blank material.

As a method of welding the sheet-shaped thin plates to form the tailored blank material, there is provided a method in which a plurality of sheet-shaped thin plates are fixed in a state in which end surfaces thereof are butted against each other with no gap therebetween, a plurality of sheet-shaped thin plates are welded by using a welding machine movable along the joined portion. There is also provided a method in which a plurality of sheet-shaped thin plates are moved in a state in which end surfaces thereof are butted against each other and then welded to each other by using a fixed type welding machine.

The continuous welding apparatus utilizing the above method for moving the sheet-shaped thin plates includes conveying members respectively for each of two thin plates, and each of the conveying members has a conveying surface inclined at an acute angle and having a step in the vertical direction. These conveying surfaces merge into a common horizontal surface at a portion just before the welding machine, for example, as disclosed in Japanese Patent Publication No. HEI 6-13153.

According to the conveying member of the sheet-shaped thin plate used for the continuous welding apparatus disclosed in this Patent Publication, however, the conveying surfaces are inclined at an acute angle and have the steps in the vertical direction, and the conveying surfaces merge into the common horizontal surface just before the welding members, i.e., welding position. Therefore, if the adjustment of guide members provided for the respective conveying members is not made precisely, there may cause an adverse possibility such that the ends to be welded of the thin plates are superposed in the vertical direction, or a gap is created therebetween. Hence, the good welding condition cannot be expected, thus being inconvenient.

Moreover, since the conveying members are themselves provided for the respective two thin plates, the adjustment therebetween, for example, in positional adjustment, requires much time and labor, including extra working.

Furthermore, the guide surfaces of the guide members are always slidably contacted to the ends to be welded of the thin plates, and hence, the change of the guide positions due to wearing may be envisioned. However, in a structure in which two thin plates are guided from opposing sides by different conveying surfaces, the relative position of the guide surfaces (surfaces to be guided) may be changed by the wearing, and in progressing of such wearing, the ends to be welded may be superposed vertically. Thus, periodical inspection for the relative positional adjustment between two thin plates will be required, thus being inconvenient.

Then, there is proposed guide rollers, as guide members, for determining a conveying center of the sheet-shaped thin plates. An end surface of the thinner thin plate (thin plate, hereinafter) is butted against an end surface of the thicker thin plate (thick plate, hereinafter) by the guide rollers so that the butted surfaces are located at constant positions. There is also proposed a technique in which the thin plate is deformed into corrugated shape to be slidable with an end surface of the thick plate.

At that time, if the guide roller is directed horizontally (its rotation axis is directed in the vertical direction), since the thick plate takes ideal rolling contact, the degree of wearing may be reduced. However, since the thin plate must bypass the guide rollers, the deformation amount thereof will be inevitably increased, straightness of a butted surface is made worse, and adhering condition with respect to the thick plate is deteriorated.

In addition, it is necessary to separately provide an additional member for deforming the thin plate into a corrugated shape, and thus, the entire structure of the apparatus will become complicated.

In this regard, if the guide roller is directed vertically (its rotation axis is directed in the horizontal direction), the thin plate which passes below the guide roller will take an ideal corrugated shape, but the width of the guide roller has to be widened in accordance with the moving amount toward the central portion of the sheet-shaped thin plate. As a result, resistance is generated when the thin plate is deformed into the corrugated shape and this adversely affects the conveying operation, which may cause a fear such that the conveying speed becomes unstable.

In addition, there is a further adverse possibility that a contact area between the guide surface of the guide roller and the thick plate is increased, the conveying resistance is increased due to the slide contact therebetween, and the wearing is hence increased. Furthermore, it is necessary to chamfer the guide surface of the guide roller to prevent the biting between the guide surface of the guide roller and the thick plate, which may result in that the deformation amount of the thin plate is increased by the chamfered amount, the straightness of the butted surface is made worse, and the adhesion to the thick plate is deteriorated.

SUMMARY OF THE INVENTION

The present invention has been accomplished in view of the above circumstances, and it is an object of the invention to provide a conveyor for a sheet-shaped thin plate and a conveying method therefor capable of making easy the adjustment in the conveying working of the sheet-shaped thin plates without superposing the ends to be welded of the sheet-shaped plates in the vertical direction.

Another object of the present invention is to also provide a conveyor for the sheet-shaped thin plate capable of smoothly guiding ends to be welded of sheet-shaped thin plates which are conveyed in a state of being laterally separated from each other, to a vertical surface passing through a welding position.

The above and other objects can be achieved according to the present invention by providing, in one aspect, a conveyor for guiding and conveying a plurality of sheet-shaped thin plates arranged side by side in rows to a welding position at which ends of the adjacent thin plates are butted and welded to each other, the conveyor comprising:

a plurality of conveying paths, which are adjacent to each other, having different conveying surfaces which are placed on a same horizontal plane, the adjacent conveying paths being separated from each other at their opposing vertical surfaces passing a welding position in a plan view at a thin plate carry-in position of the conveyor with a distance which gradually approaches toward the welding position at which the ends of the adjacent thin plates are butted against and welded to each other;

a guide unit disposed between the adjacent two conveying paths for guiding the thin plates on one of the conveying paths with respect to another one thereof toward the welding position, the conveying paths each comprising a plurality conveying rollers disposed in parallel to each other with a predetermined distance between adjacent conveying rollers in a conveying direction of the thin plates and a driving unit for driving the conveying rollers, and the guide unit having a guide surface for guiding the thin plate on the one of the conveying paths in a state that the thin plate on the one conveying path is partially depressed with respect to the another one of the conveying path and that the ends of the thin plates on the adjacent conveying paths are butted against and welded to each other at the welding portion.

In a preferred embodiment, the guide unit may comprise a plurality of guide rollers each arranged between the adjacent conveying rollers and having a shape for forming the depressed portions to the thin plate conveyed on the one of the conveying paths.

In the above embodiment, it may be desired that each of the guide rollers is a cylindrical roller having an axial end surface constituting the guide surface.

In a further preferred embodiment, it may be desired that each of the guide rollers has an end surface in the axial direction so as to form the guide surface and an outer peripheral surface which forms an abutting surface to the thin plate so that the outer peripheral surface of the guide roller is increased in diameter toward the end surface forming the guide surface.

In this embodiment, it may be further desired that an outside of the outer peripheral surface of the guide roller is inclined with respect to the conveying surface of the flat conveying path.

This guide roller may have a width smaller than a width of the conveying roller, the guide roller is disposed on the side of the vertical surface passing through the welding position, a height of at least the guide surface of the guide roller is formed to be higher than a thickness of the thin plate which abuts against the guide surface.

The guide surface of the end surface of the guide roller in the axial direction may be formed so that at least an inlet side of the conveying path is opened outward in a plan view.

It may be desired that the guide rollers are disposed such that rotation axes thereof are inclined in the vertical direction with respect to the conveying surfaces of the conveying paths.

The guide rollers may be further disposed so that the rotation axes thereof are inclined upward on a side of the vertical surface passing through the welding position.

It may be also desired that one of the thin plates, conveyed on the one of the conveying paths at which the guide rollers are disposed, has a thickness thinner than a thickness of the thin plate conveyed on the another one of the conveying path.

The guide rollers may be supported to be freely rotated in accordance with the passing of the thin plates, on the one of the conveying paths, which are conveyed by the conveying rollers.

The depressed portion may have a depth substantially corresponding to a thickness of the thin plate.

The conveyor may further comprise a set unit disposed on a downstream side of the guide unit to set the thin plate such that the end of the thin plate on the one of the conveying path set to be parallel to the vertical surface of the thin plate conveyed on the another one of the conveying path to the welding portion.

In another aspect of the present invention, there is also provided a method of guiding and conveying a plurality of sheet-shaped thin plates to a welding position at which ends of the adjacent thin plates are butted and welded to each other, wherein the thin plates are conveyed on a plurality of conveying paths having conveying surfaces disposed on a same horizontal plane, an end to be welded of the thin plate conveyed on one of the conveying paths is contacted to a guide surface positioned in a vertical plane passing the welding position and an end to be welded of the thin plate conveyed on adjacent another one of the conveying path is butted against the end to be welded of the thin plate guided on the one of the conveying paths.

According to the preferred embodiments of the present invention of the characters and structures mentioned above, the thin places can be guided smoothly by adjusting the guide surface of only one of the conveying paths, so that the adjusting working can be shortened. Moreover, according to the present invention, the vertical overlapping or superposing of the end portions to be welded of both the thin plates can be prevented.

In addition, the guide surface positions are not relatively changed, which can eliminate the necessity of the periodical positional adjustment while maintaining the high welding quality. Furthermore, burrs or like generated during the sharing or cutting operation of the thin plates can be automatically removed through the sliding contact between the thin plates to be welded, thus improving the butt-welding performance of the thin plates to be welded.

Furthermore, according to the embodiment of the present invention, particularly of the embodiment, in which the guide roller having the tapered surface, the sheet-shaped thin plates guided by the guide surfaces formed on the end surfaces of the guide rollers in the axial direction are prevented from being bitten by the guide rollers, and the ends to be welded of the thin plates can thus be guided to the welding position at a high reliability.

In addition, in this embodiment, since the contact portion between the guide surface and the end to be welded of the thin plate having thinker thickness constitutes a point contact, the deformation of this plate can be reduced. Furthermore, since the deformation amount of the thin plate curved by the guide rollers can be reduced, the straightness of the butted surface with respect to the other thin plate can be improved, and the adhesion between the sheet-shaped thin plates can be also improved.

The nature and further characteristic features of the present invention will be made more clear from the following descriptions made with reference to the accompanying drawings.

DESCRIPTION OF THE PREFERRED EMBODIMENT

Hereunder, a preferred embodiment of the present invention will be explained with reference to the accompanying drawings. Further, it is to be noted that terms "upper", "lower", "right", "left" and the like terms are used herein with reference to the illustrated state on the drawings or in a usually operative state of the apparatus.

Figure 1:
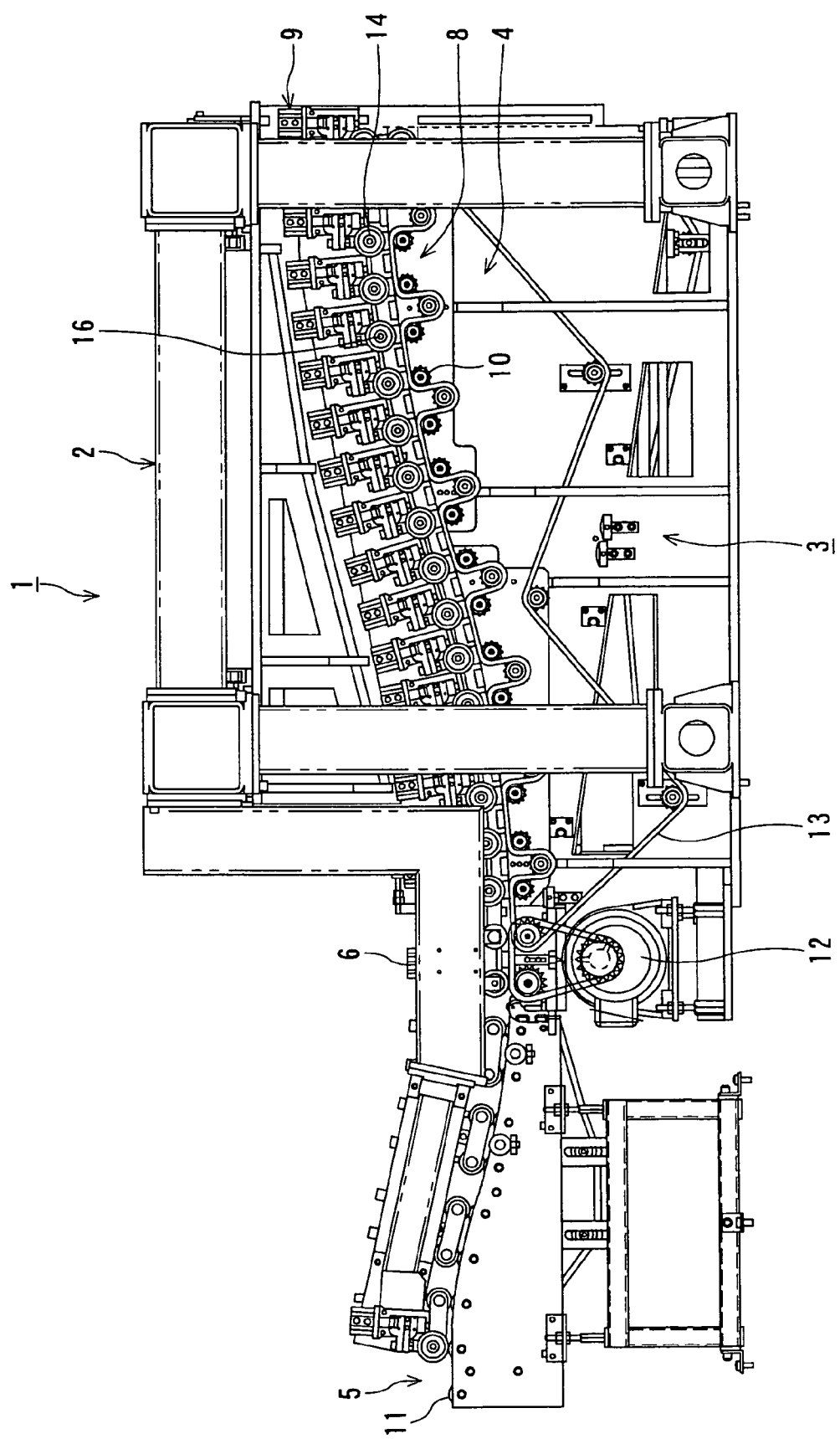
FIG. 1 is an elevational view of a continuous welding apparatus including an embodiment of a conveyor for a sheet-shaped thin plate according to the present invention.

FIG. 1 shows a continuous welding apparatus to which a conveyor for a sheet-shaped thin plate of the present invention is applicable (which may be called hereinafter "sheet-shaped thin plate conveyor" or merely "conveyor").

As shown in FIG. 1, the continuous welding apparatus or machine 1 includes a sheet-shaped thin plate conveyor 3 assembled to a framework 2. The conveyor 3 mainly includes a carry-in unit 4 and a carry-out unit 5 for the sheet-shaped thin plates.

In this embodiment, a fixed laser welding machine 6 is used as welding means. The laser welding machine 6 is disposed above and between the carry-in unit 4 and the carry-out unit 5. Two sheet-shaped thin plates are welded to each other by irradiation of laser beam from the laser welding machine 6.

FIGS. 2 to 10 represent various views of the carry-in unit 4 and its associated portions.

As shown in FIGS. 2 to 10, the continuous welding apparatus 1 conveys two or more sheet-shaped thin plates 7A and 7B which are previously cut into fine rectangle shape. The thin plates 7A and 7B are welded in this state continuously in the longitudinal direction by operating the welding machine 6, and then combined to thereby form a tailored blank material, not shown.

More specifically, the two thin plates 7A and 7B arranged in the widthwise direction and having different thicknesses are conveyed toward the welding machine 6 by the carry-in unit 4, the two sheet-shaped thin plates 7A and 7B are joined to each other by using the welding machine 6 at a predetermined position and then, the integrally formed tailored blank material is conveyed outward by the carry-out unit 5.

The carry-in unit 4 and the carry-out unit 5 for the sheet-shaped thin plates 7A and 7B are each composed of a conveying roller unit 8 disposed on a floor, for example, and a clamp roller unit 9 disposed above the conveying roller unit 8. The sheet-shaped thin plates 7A and 7B are sandwiched at their upper and lower portions between the clamp roller unit 9 and the conveying roller unit 8 and conveyed in this state.

The conveying roller unit 8 is provided, at its front half, with a plurality of carry-in rollers 10 and, at its rear half, with a plurality of carry-out rollers 11. The carry-in and carry-out rollers 10 and 11 are rotated through a belt 13 or like member which is driven by a driving device such as motor 12 disposed between the carry-in unit 4 and the carry-out unit 5. A clamp roller 14 of the clamp roller unit 9 pushes the sheet-shaped thin plates 7A and 7B against the carry-in and carry-out rollers 10 and 11 of the carry-in unit 4 and control the slippage between the sheet-shaped thin plates 7A and 7B and the carry-in and carry-out rollers 10 and 11.

Further, in the described embodiment, two carry-in units 4 are disposed respectively for the sheet-shaped thin plates 7A and 7B, and the carry-in units 4 have separate conveying surfaces, but in the same horizontal plane, with a vertical surface therebetween passing through a welding position of the welding machine 6 at which the ends thereof butted and welded together.

The clamp roller unit 9 is constructed to be movable so as not to constitute an obstacle at a time when the sheet-shaped thin plates 7A and 7B are installed. The conveying roller unit 8 is fixed to the framework 2 or the like.

The carry-in roller 10 is rotatably supported by a rotating shaft 15 orthogonal to an axis in a conveying direction of the sheet-shaped thin plates 7A and 7B, and the plurality of carry-in rollers 10 are disposed in parallel to each other in each of the two sheet-shaped thin plates 7A and 7B along the axis of the conveying direction thereof. The clamp rollers 14 are disposed so as to correspond to the carry-in rollers 10 to thereby sandwich the sheet-shaped thin plates 7A and 7B therebetween. Rotating shafts 16 rotatably support the clamp rollers 14, and the rotating shafts 16 are disposed in parallel to the rotating shafts 15 of the carry-in rollers 10.

Figure 3:
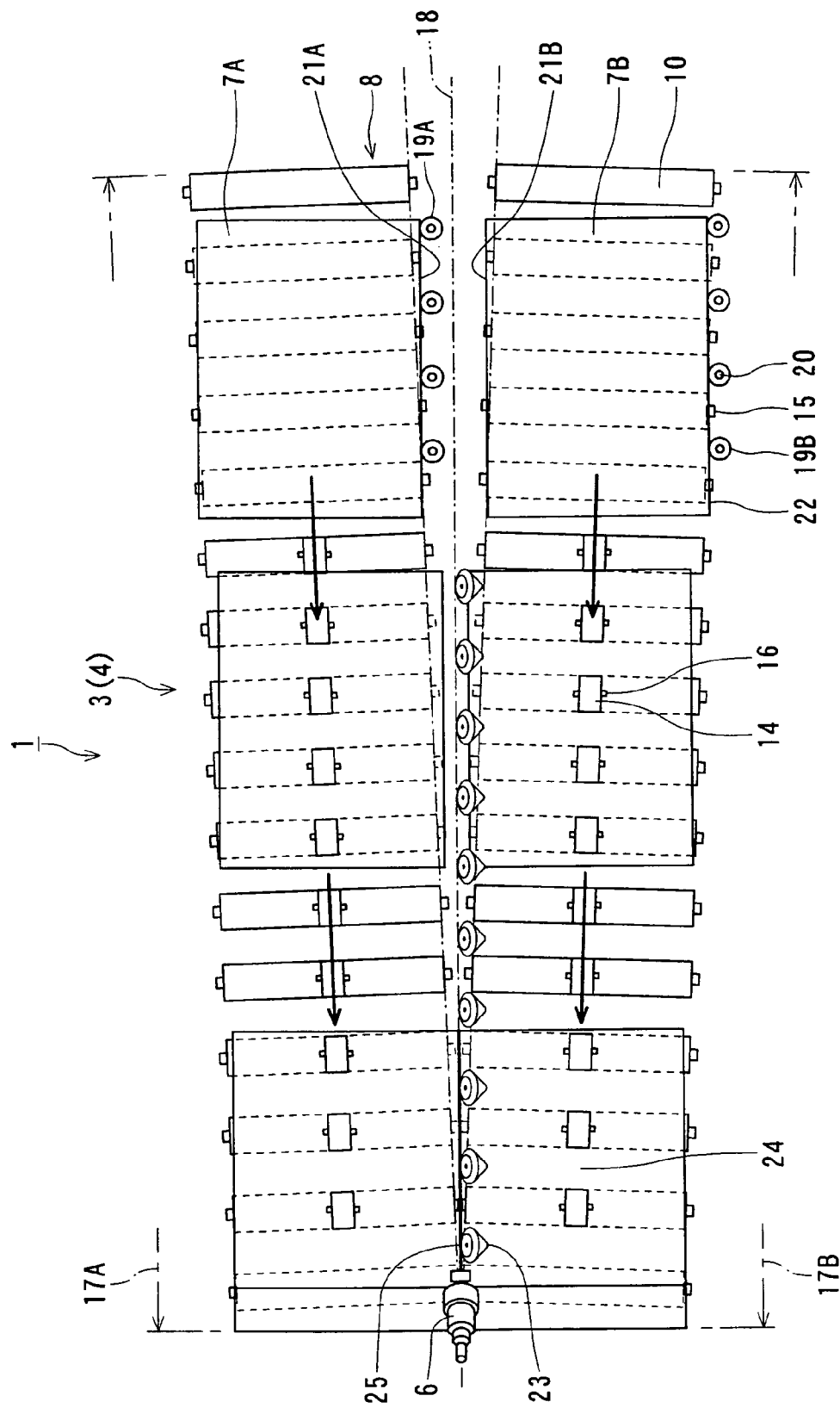
FIG. 3 is a schematic plan view of the carry-in unit.
Figure 4:
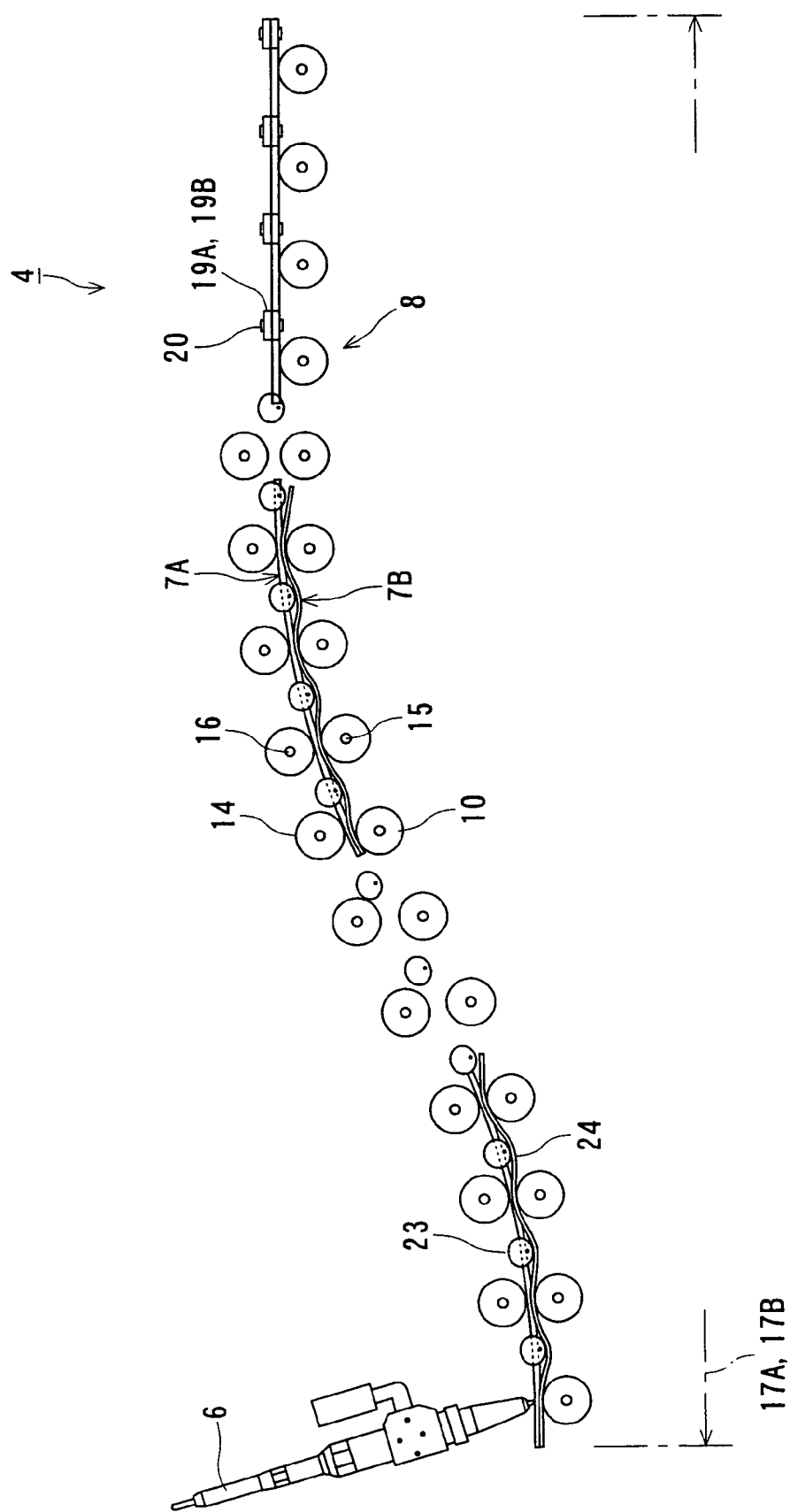
FIG. 4 is a schematic side view of the carry-in unit.

The two rows of carry-in rollers 10 which convey the two sheet-shaped thin plates 7A and 7B form conveying paths 17A and 17B. As shown in FIG. 3, the conveying paths 17A and 17B have inlet sides apart from each other in the horizontal direction as viewed in a plan view, and have outlet sides at which the conveying paths 17A and 17B have conveying directions inclined in the direction of a center axis 18 of the conveyor 3, i.e., in the horizontal direction, such that the conveying paths 17A and 17B approach each other toward a vertical surface passing through the center axis 18 of the conveyor 3, i.e., a welding position of the welding machine 6 at the outlet sides of the conveying paths 17A and 17B. As shown in FIG. 4, the conveying surfaces of both the conveying paths 17A and 17B include a common horizontal surface, i.e., exist in the same horizontal plane.

More specifically, each of the conveying paths 17A and 17B is composed of a plurality of conveying rollers which are arranged in parallel with a predetermined distance between the adjacent ones in their conveying direction.

A plurality of set rollers 19A and 19B for determining input positions of the two sheet-shaped thin plates 7A and 7B are disposed as guide members on the inlet sides of the conveying paths 17A and 17B. The set rollers 19A and 19B are rotatably supported by a rotating shaft 20 in the vertical direction. The set rollers 19A and 19B abut against one side end edges of the two sheet-shaped thin plates 7A and 7B, respectively, and guide the thin plates 7A and 7B in the input position.

In this embodiment, in the thicker thin plates 7A (thick plates, hereinafter) (upper ones in FIG. 3), an end to be welded 21A on the side of the center axis 18 of the conveyor 3 abuts against the set rollers 19A and is guided in parallel to the vertical surface passing through the welding position of the welding machine 6. In the thinner thin plates 7B (thin plate, hereinafter) (lower ones in FIG. 3), an outer end edge 22 opposite to the center axis 18 of the conveyor 3 abuts against the other set rollers 19B and is guided. That is, the two sheet-shaped thin plates 7A and 7B are guided by different guide surfaces which do not exist in the common vertical surface in the input position of the inlet side.

Figure 2:
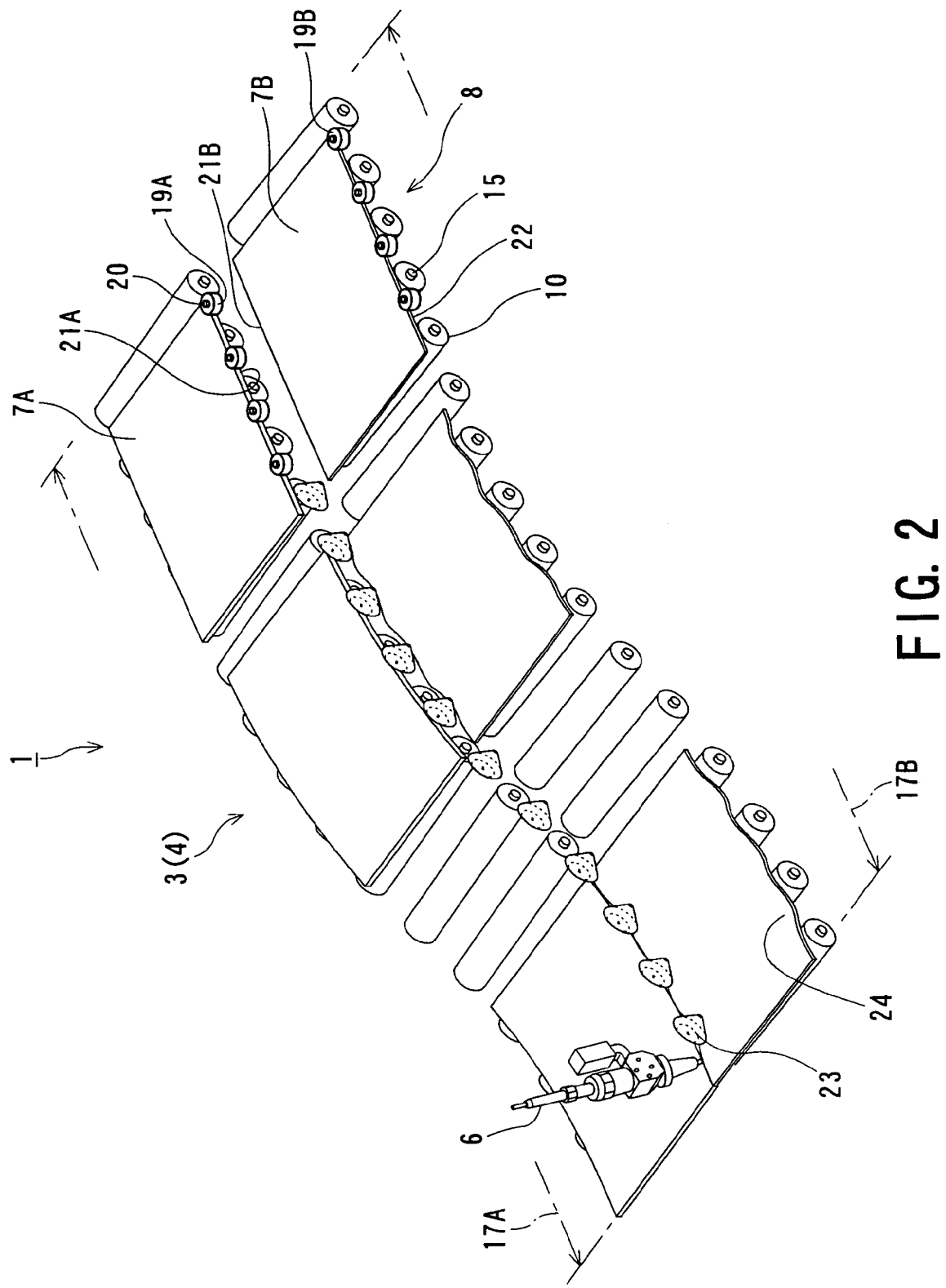
FIG. 2 is a schematic perspective view of a carry-in unit of the conveyor.

The two sheet-shaped thin plates 7A and 7B are conveyed toward the welding machine 6 on the conveying paths 17A and 17B while gradually approaching each other such that the ends to be welded 21A and 21B abut against each other on the upstream side of the welding machine 6 disposed on the outlet sides of the conveying paths 17A and 17B (see FIGS. 2 and 3). The clamp rollers 14 are disposed in ranges excluding the input positions of the sheet-shaped thin plates 7A and 7B.

In this embodiment, a plurality of guide rollers 23 are disposed just in front of the welding machine 6 on the outlet side of the conveying path 17B of the thin plate 7B of the conveying paths 17A and 17B. The guide rollers 23 are disposed above the thin plates 7B as viewed in a side view, and between the carry-in rollers 10, i.e., conveying rollers arranged in parallel to each other in their advancing direction, as viewed in a plan view, i.e., such that the carry-in rollers 10 and the guide rollers 23 are alternately arranged. Further, these guide rollers 23 are supported to an apparatus frame to which the rotating shaft 16 of the clamp roller 14 of the clamp unit 9 is also supported. The guide rollers 23 are supported to be freely rotated by the passing of the thin plates on the conveying rollers which are rotated by, for example, the motor 12.

Figure 5:
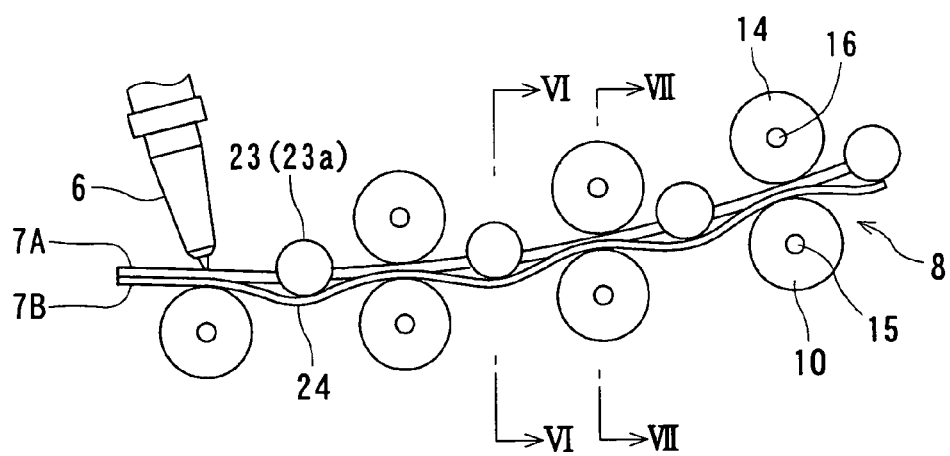
FIG. 5 is an enlarged side view of an essential portion of the carry-in unit of FIG. 4 according to one preferred example of the present invention.
Figure 6:
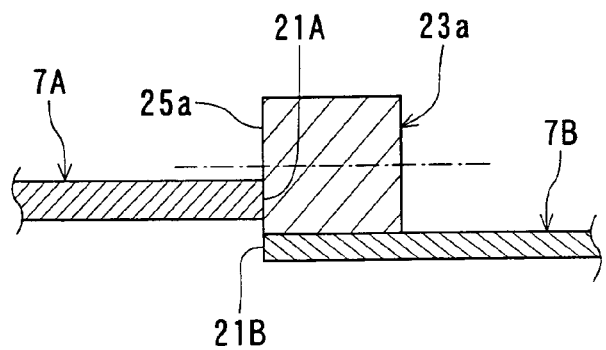
FIG. 6 is a sectional view taken along the line VI-VI in FIG. 5 especially showing one embodiment of a guide unit.
Figure 7:
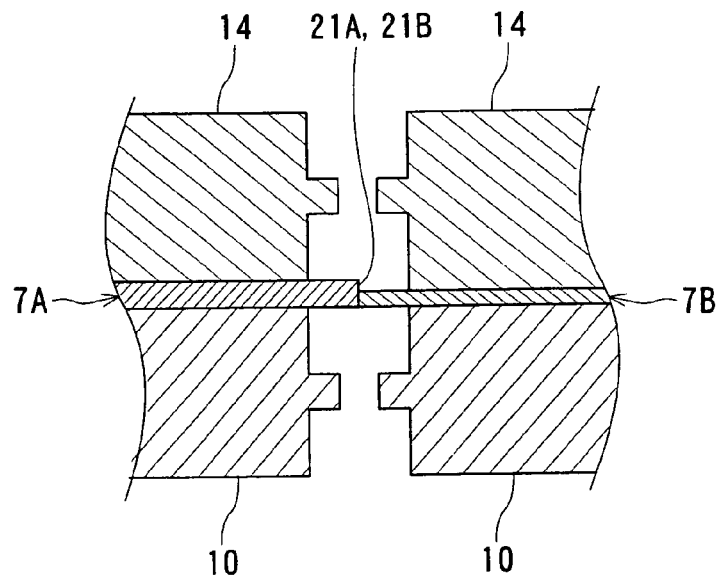
FIG. 7 is a sectional view taken along the line VII-VII in FIG. 5.
Figure 8:
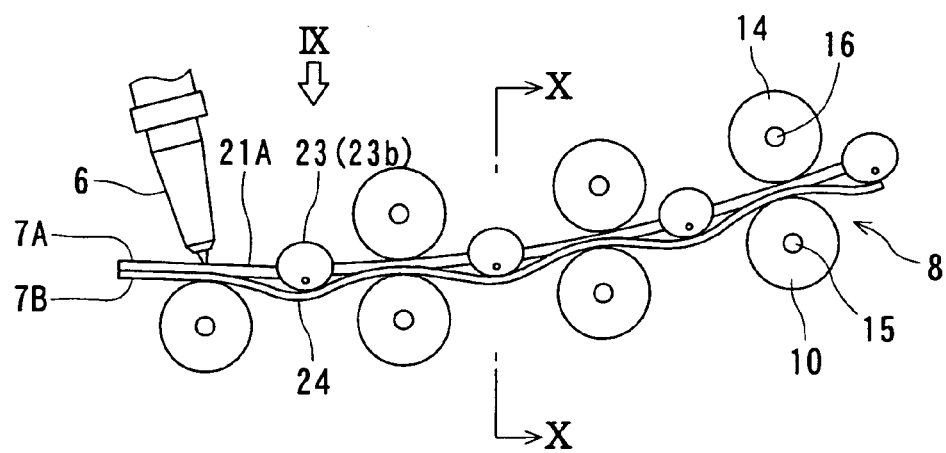
FIG. 8 an enlarged side view of an essential portion of the carry-in unit of FIG. 4 according to another preferred example of the present invention.
Figure 9:
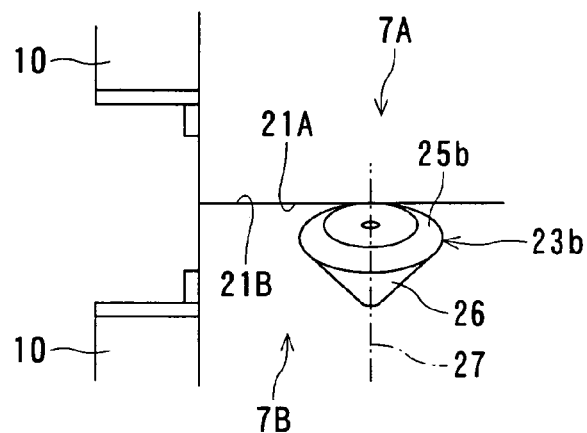
FIG. 9 is a diagram viewed from an arrow IX in FIG. 8 especially showing another embodiment of the guide unit.
Figure 10:
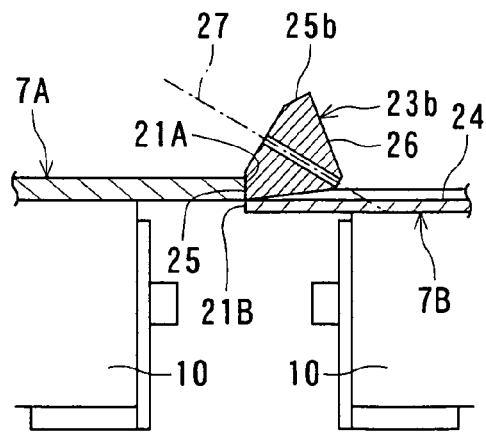
FIG. 10 is a sectional view taken along the line X-X in FIG. 8.

Further, exemplary embodiments of the present invention can employ the guide rollers 23 having various structures such as described hereinlater with reference to FIGS. 5 to 7 as guide roller 23a, and with reference to FIGS. 8 to 10 as guide roller 23b, and it is to be noted that the guide rollers 23 shown in the aforementioned FIGS. 2 to 4 represent the guide roller 23b for the sake of convenience.

In one exemplary embodiment, as shown in FIGS. 5 and 7, the guide rollers 23 (in this embodiment guide rollers 23a) are set in their positions such that the thin plate 7B conveyed through the one conveying path 17B is partially pushed down, by an amount substantially corresponding to the thickness of the thin plate 7B, lower than the thick plate 7A conveyed through the other conveying path 17A so as to form curved recesses or recessed portions 24 between the carry-in rollers 10 of the one conveying path 17B.

More specifically, as mentioned before, each of the guide rollers 23 (23a, 23b) is arranged between the adjacent conveying rollers 10 (11) with a gap therebetween through which the thin plate on one conveying path can pass with being depressed by a predetermined amount by the guide roller 23 with the end to be welded thereof being maintained in the same horizontal plane as that of the other conveying path.

In addition, in this example, the guide roller 23a is formed with an end surface, as a guide surface, in the axial direction on the center side positioned in the vertical plane passing the welding position of the welding machine 6. Furthermore, the other conveying path 17A formed by the carry-in rollers 10 has a flat conveying surface.

The guide roller 23a serves a guide member for guiding the thin plate 7A having the thicker plate thickness to the welding position of the welding machine 6. The end surface in the axial direction on the center side of the guide roller 23a serves as the guide surface 25 (in this embodiment, guide surface 25a) for guiding the end to be welded 21A of the thin plate 7A to a position just before the welding machine 6 along the center axis 18 of the conveyor 3 by pushing the end to be welded 21A of the thin plate 7A conveyed by the carry-in roller 10. On the other hand, the end to be welded 21B of the thin plate 7B having the thinner plate thickness conveyed by the carry-in roller 10 is pushed against the other thin plate 7A guided by the guide surface 25a of the guide roller 23a as the thin plate 7B approaches the welding machine 6, and finally, guided to the vertical surface passing through the center axis 18 of the conveyor 3.

According to this embodiment shown in FIGS. 5 to 7, the end 21A to be welded of one thin plate 7A guided in the predetermined form by the guide rollers 23a are pushed and butted against the end 21B to be welded of the other thin plate 7B at the welding position or point of the welding machine 6, i.e., the center axis 18 of the conveyor 3. Therefore, the adjustment can be performed only by adjusting the guide surface 25a (end surface on the center side axial direction) of one of the thin plate 7A, thus simplifying the adjusting working.

In addition, in the present embodiment, both the thin plates 7A and 7B can be conveyed to the welding position by the welding machine 6 in the state that both the ends 21A and 21B are to abut against to each other along the entire longitudinal directions on the different conveying paths 17A and 17B having common horizontal surfaces, thus preventing the ends 21A and 21B from being superposed in the vertical direction during the conveyance of the thin plates 7A and 7B.

Furthermore, since the guide roller 23a is formed with the guide surface 25a (end surface in the axial direction of the center side) only for one of the thin plate 7A and not with the guide surface for the other thin plate 7B. Therefore, even if the guide surface 25a of the guide roller 23a is worn through the sliding contact to the end 21A of the thin plate 7A, there is no causing of relative positional change of the guide surface 25a, and accordingly, the welding quality can be highly maintained even without carrying out periodical relative position adjustment, thus being advantageous.

Still furthermore, as mentioned above, both the thin plates 7A and 7B can be conveyed to the welding machine 6 in the state that both the ends 21A and 21B abut against to each other, and the end 21B of the thin plate 7B slidably contacts the end 21A of the thin plate 7A while repeating vertical waving motion by the alternating location of the guide roller 23a and the carry-in roller 10. Accordingly, burr or like generated during the sharing time of the thin plates 7A and 7B can be automatically removed through such sliding contact, whereby the surface smoothness or performance of the butted surfaces of the ends 21A and 21b to be welded can be improved.

As mentioned hereinbefore, on the other hand, FIGS. 8 to 10 represent another exemplary embodiment of the present invention, in which the guide rollers 23 (in this embodiment guide rollers 23b) are set in their positions such that the thin plate 7B conveyed through the one conveying path 17B is partially pushed down, by an amount substantially corresponding to the thickness of the thin plate 7B, lower than the thick plate 7A conveyed through the other conveying path 17A so as to form curved recesses or recessed portions 24 between the carry-in rollers 10 of the one conveying path 17B.

That is, as mentioned before for the former embodiment, each of the guide rollers 23b is disposed between the adjacent conveying rollers 10 (11) with a gap through which the thin plate passes in a downward depressed state.

The guide rollers 23b may constitute another guide means for guiding the thick plate 7A to the welding position of the welding machine 6. An end surface, in the axial direction on the central side, located in the vertical surface through which the center axis 18 of the conveyor 3 passes, i.e., the vertical surface passing through the welding position of the welding machine 6, is provided as a guide surface 25 (guide surface 25b in this embodiment). When the end to be welded 21A of the thin plate 7A conveyed by the carry-in rollers 10 is pushed against this guide surface 25b, the end to be welded 21A of the thick plate 7A is guided immediately in front of the welding machine 6 along the center axis 18 of the conveyor 3.

The guide roller 23b is tapered such that an outer peripheral surface 26 forming an abutting surface with respect to the thin plate 7B is gradually increased in diameter toward the axial end surface forming the guide surface 25b, and the guide roller 23b is disposed such that its rotation axis 27 is inclined in the vertical direction with respect to the conveying surface.

More preferably, the outer peripheral surface 26 of the guide roller 23b is disposed such that its outer side is upwardly inclined with respect to the conveying surface of the flat conveying path 17B and the vertical surface side of the rotation axis 27 is upwardly inclined.

The width of the guide roller 23b is formed to be smaller than that of the carry-in roller 10 constituting the conveying path 17B, only the guide roller 23b is disposed on the side of the vertical surface passing through the welding position, and at least the guide surface 25b has a height higher than the thickness of the thin plate 7A which abuts against the guide surface 25b.

For the guide surface 25b of the end surface of the guide roller 23b in the axial direction, at least the inlet sides of the conveying paths 17A and 17B are opened outward as viewed in the plan view.

The end 21B of the thin plate 7B conveyed by the carry-in rollers 10 is pushed against the end 21A of the other thin plate 7A guided by the guide surface 25b which is a center side end surface of the guide roller 23b in the axial direction as the thin plate 7B approaches the welding position of the welding machine 6, and finally, the end 21B is guided by the vertical surface through which the center axis 18 of the conveyor 3 passes.

This exemplary embodiment will function and operate as follows.

As the guide surface 25b, there is formed the center side end surface of the guide roller 23b which guides the thicker thin plate 7A to the welding position of the welding machine 6 in the axial direction located in the vertical surface passing through the welding position of the welding machine 6. The guide roller 23b is tapered so that the outer peripheral surface 26 forming the abutting surface with respect to the thinner thin plate 7B is gradually increased in diameter toward the end surface in the axial direction so as to form the guide surface 25b, and the outer peripheral surface 26 of the guide roller 23b is disposed so that its outer side is upwardly inclined with respect to the conveying surface of the flat conveying path 17B.

Furthermore, the width of the guide roller 23b is formed to be smaller than that of the carry-in roller 10 constituting the conveying path 17B, only the guide roller 23b is disposed on the side of the vertical surface passing through the welding position, and at least the guide surface 25b has a height set to be higher than the thickness of the thick plate 7A which abuts against the guide surface 25b. Accordingly, the ends to be welded 21A and 21B of the two sheet-shaped thin plates 7A and 7B, which are conveyed to be laterally separated from each other can smoothly be guided to the vertical surface passing through the welding position.

In addition, the rotation axis 27 of the guide roller 23b is disposed to be inclined in the vertical direction with respect to the conveying surface, and the side of the vertical surface passing through the welding position is upwardly inclined. The guide surface 25b of the end surface of the guide roller 23b in the axial direction is formed so that at least the inlet sides of the conveying paths 17A and 17B can be opened toward outside as viewed in the plan view.

Accordingly, the sheet-shaped thin plate, which is guided by the guide surface 25b formed on the end surface of the guide roller 23b in the axial direction, i.e., the thicker thin plate (thick plate) 7A, is prevented from being bitten by the guide roller 23b, and the end 21A to be welded of the thick plate 7A can reliably be guided to the welding position.

Further, since the thick plate 7A is prevented from being bitten, the chamfering working which was required in the conventional technique becomes unnecessary, the outer diameter of the guide roller 23b can be set to the minimum and thus, the deformation amount of the thin plate 7B can be reduced.

Furthermore, a contacting portion between the guide surface 25b and the end 21A of the thick plate 7A constitutes a point contact different from surface contact, thus reducing the deformation of the thick plate 7A. The width of the guide roller 23b can be made constant irrespective of the moving amounts of the sheet-shaped thin plates 7A and 7B. As a result, since the thin plate 7B is gradually deformed in accordance with the tapered shape, the resistance is reduced, the deforming or deformed region can be reduced, and the influence on the conveying steed can be also reduced. In addition, slippage between the thicker thin plate 7A and the guide roller 23b can be reduced, hence the wearing being also reduced.

Still furthermore, the thickness of the sheet-shaped thin plate 7B, which is conveyed on the side of the adjacent conveying paths 17A and 17B where the guide roller 23b is disposed, is formed to be thinner than the thickness of the sheet-shaped thin plate 7A. Accordingly, the deformation amount of the thin plate 7B (thinner plate) having thinner plate thickness curved by the guide roller 23b can be reduced. As a result, a straightness of a butt surface with respect to the thick plate 7A can be improved, and the adhesion with respect to the thick plate 7A can be also improved.

As mentioned hereinabove, according to the preferred embodiments of the present invention, there is thus provided a conveyor for a sheet-shaped thin plate capable of making easy the adjustment in the conveying working of the sheet-shaped thin plates without superposing the ends to be welded of the plural sheet-shaped plates in the vertical direction.

It is further to be noted that the present invention is not limited to the described embodiments and many other changes and modifications may be made without departing from the scope of the appended claims.

What is claimed is:

1. A conveyor for guiding and conveying a plurality of sheet-shaped plates to a welding position, comprising:

a plurality of driven conveying rollers disposed in parallel to each other and provided side-by-side on the same horizontal plane to define adjacent conveying paths, wherein the conveying rollers are driven to convey sheet-shaped plates in a conveying direction along the conveying paths, and wherein the conveying rollers are arranged such that the conveying paths are horizontally separated from each other upstream in the conveying direction and horizontally approach each other downstream in the conveying direction whereby opposing vertical edges of sheet-shaped plates conveyed on the conveying rollers abut one another at a certain position along the conveying direction, which certain position is upstream of the welding position in the conveying direction; and a guide unit having a guide surface and being positioned to vertically deform the opposing edge of one of the sheet shaped plates with respect to the opposing edge of the other of the sheet shaped plates at a position in the conveying direction between two of said conveying rollers conveying the one of the sheet shaped plates, and upstream of said certain position.

2. The conveyor according to claim 1, wherein said guide unit comprises a plurality of guide rollers, each arranged between two of said conveying rollers and having said guide surface.

3. The conveyor according to claim 2, wherein each of said guide rollers has an axial end surface constituting the guide surface.

4. The conveyor according to claim 2, wherein each of said guide rollers has an end surface in the axial direction so as to form the guide surface and an outer peripheral surface positioned to vertically depress the opposing edge of the one of the sheet shaped plates, wherein the outer peripheral surfaces is arranged such that the diameter of the guide roller increases toward the end surface forming the guide surface.

5. The conveyor according to claim 4, wherein the outer peripheral surface of each of the guide rollers is inclined with respect to the conveying path.

6. The conveyor according to claim 5, wherein the guide rollers have a width in a horizontal direction transverse to the conveying direction which is smaller than a width of the conveying rollers, the guide rollers are disposed at one the side of a vertical surface extending in the conveying direction and passing through the welding position, wherein the height of the guide surface of the guide rollers is greater than the thickness of the other plate which abuts against the guide surface.

7. The conveyor according to claim 5, wherein an inlet side of the conveying paths is opened outward in a plan view.

8. The conveyor according to claim 7, wherein the guide rollers are disposed such that rotation axes thereof are inclined in the vertical direction with respect to the conveying surfaces of the conveying paths.

9. The conveyor according to claim 7, wherein the guide rollers are disposed so that the rotation axes thereof are inclined upward on a side of the vertical surface passing through the welding position.

10. The conveyor according to claim 2, wherein the guide rollers are supported to be freely rotated.

11. The conveyor according to claim 2, wherein the deformed portion has a depth substantially corresponding to the thickness of the one plate.

12. The conveyor according to claim 1, further comprising a set unit disposed upstream of the guide unit and arranged to set a plate on one of the conveying paths to be parallel to a vertical surface extending in the conveying direction and passing through the welding position.

* * * * *